(12) United States Patent
Lam

(10) Patent No.: US 6,760,869 B2
(45) Date of Patent: Jul. 6, 2004

(54) REPORTING HARD DISK DRIVE FAILURE

(75) Inventor: Son H. Lam, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 09/893,574

(22) Filed: Jun. 29, 2001

(65) Prior Publication Data
US 2003/0005367 A1 Jan. 2, 2003

(51) Int. Cl.[7] .............................................. H02H 3/05
(52) U.S. Cl. ............................................ 714/42; 714/48
(58) Field of Search ............................. 714/42, 44, 48, 714/57, 710, 718; 710/15, 18, 19; 711/4, 111, 114; 369/53.1

(56) References Cited

U.S. PATENT DOCUMENTS 5,838,891 A * 11/1998 Mizuno et al. ............... 714/5
6,247,152 B1 * 6/2001 Russell ...................... 714/718
6,327,679 B1 * 12/2001 Russell ...................... 714/710
6,427,215 B2 * 7/2002 Rafanello et al. ........... 714/710
6,519,762 B1 * 2/2003 Colligan et al. ............. 717/170
6,532,552 B1 * 3/2003 Benignus et al. ............. 714/25

* cited by examiner

Primary Examiner—Dieu-Minh Le
(74) Attorney, Agent, or Firm—Christopher K. Gagne

(57) ABSTRACT

A technique for reporting a hard disk drive failure in a computer system includes detecting a failure of one of a plurality of hard disk drives and reporting the failure to a CIMOM (Conceptual Information Model Object Manager) which in turn forwards a message by an LRA (Local Response Agent) to a PMP (Platform Management Provider) which in turn forwards a command to an SMC (Server Management Controller), which forward the command to an HSC (Hot-Swap Controller) activate a display, the display reporting the failure or of a particular one of the hard disk drives to a user.

45 Claims, 3 Drawing Sheets

REPORTING HARD DISK DRIVE FAILURE

FIELD

The present invention relates to reporting hard disk drive failures. More particularly, the present invention is related to reporting hard disk drive failures in an entry level server or appliance server without using SAF-TE logic.

BACKGROUND

Typically, an entry level server has two hot-swap HDDs (Hard Disk Drives). If one of the HDDs fails, SAF-TE (SCSI Accessed Fault-Tolerant Enclosures) Interface logic will turn on an LED (Light Emitting Diode) to indicate which HDD has failed so that a user can replace the failed HDD. Hot-swapping allows the user to replace the failed HDD without shutting down the system, thereby improving the system reliability and availability.

The SAF-TE Interface logic provides a standard non-proprietary way for third party disk and RAID controllers to be automatically integrated with peripheral packaging that supports status signals (e.g.-LEDs, audible alarms, LCDs, etc.), hot swapping of HDDs, and monitoring of enclosure components.

Presently, the SAF-TE logic capability is only supported via a RAID controller which resides either on a PCI card or on a motherboard. However, to reduce costs, entry level servers may not include a RAID controller. Accordingly, such entry level servers cannot use SAF-TE logic to report an HDD failure to the user.

Similarly, in appliance servers, SAF-TE controllers communicate with respective BMCs (Baseboard Management Controllers) via IPMI (Intelligent Platform Management Interface) commands. As noted above, SAF-TE logic capability is only supported via the RAID controller which resides either on a PCI card or on a motherboard. Unfortunately, to reduce costs, appliance servers may not include a BMC or a RAID controller. Accordingly, such appliance servers also cannot use SAF-TE logic to report an HDD failure to the user.

BRIEF DESCRIPTION OF THE DRAWINGS

The foregoing and a better understanding of the present invention will become apparent from the following detail description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
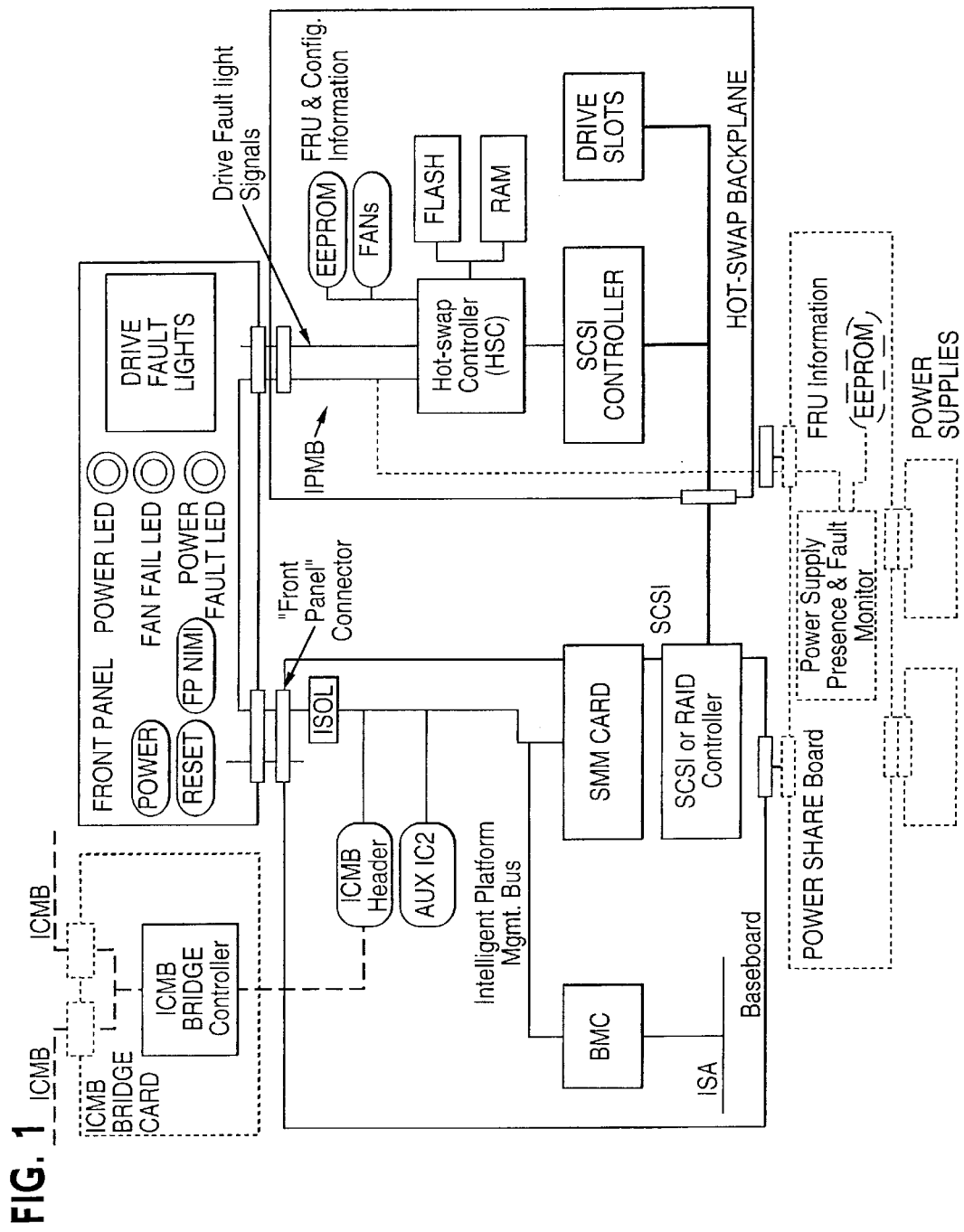
FIG. 1 is a block diagram illustrating the management bus routing in a RAID equipped server.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. In addition, arrangements may be shown a block diagram form to avoid obscuring the invention, and also view of the fact that specifics with respect to implementation of such block diagrams are highly dependent upon the platform within which the present invention is to be implemented, that is, such specifics should be well within the purview of one skilled in the art. Where specific details have been set forth in noted to describe example embodiments of the invention, it should be apparent to one skilled in the art that the invention can be practiced without, or with variations of, these specific details. Finally, it should be apparent to one skilled in the art that differing combinations of hard-wired circuitry and software instructions can be used to implement embodiments of the present invention, that is, the present invention is not limited to any specific combination of hardware and software.

FIG. 1 is a block diagram illustrating the management bus routing in a RAID equipped server having both a BMC and a RAID controller. As illustrated in FIG. 1, power supplies are connected to a Power Share Board including a Power Supply Presence & Fault Monitor and an EEPROM having FRU information stored therein. A baseboard includes a BMC and an SMM which are connected to an IPMB bus. The baseboard also includes a SCSI or RAID controller connected to a Hot-Swap Backplane having a SCSI controller and drive slots to which hard disk drives are connected. The backplane also includes a hot-swap controller having both FLASH and RAM memories. A front panel includes the usual indicators and switches as well as the drive fault lights. The drive fault lights are used to inform the user of an HDD fault and to inform the user as to which HDD needs to be replaced. An ICMB Bridge Card including an ICMB Bridge Controller is also included.

Figure 2:
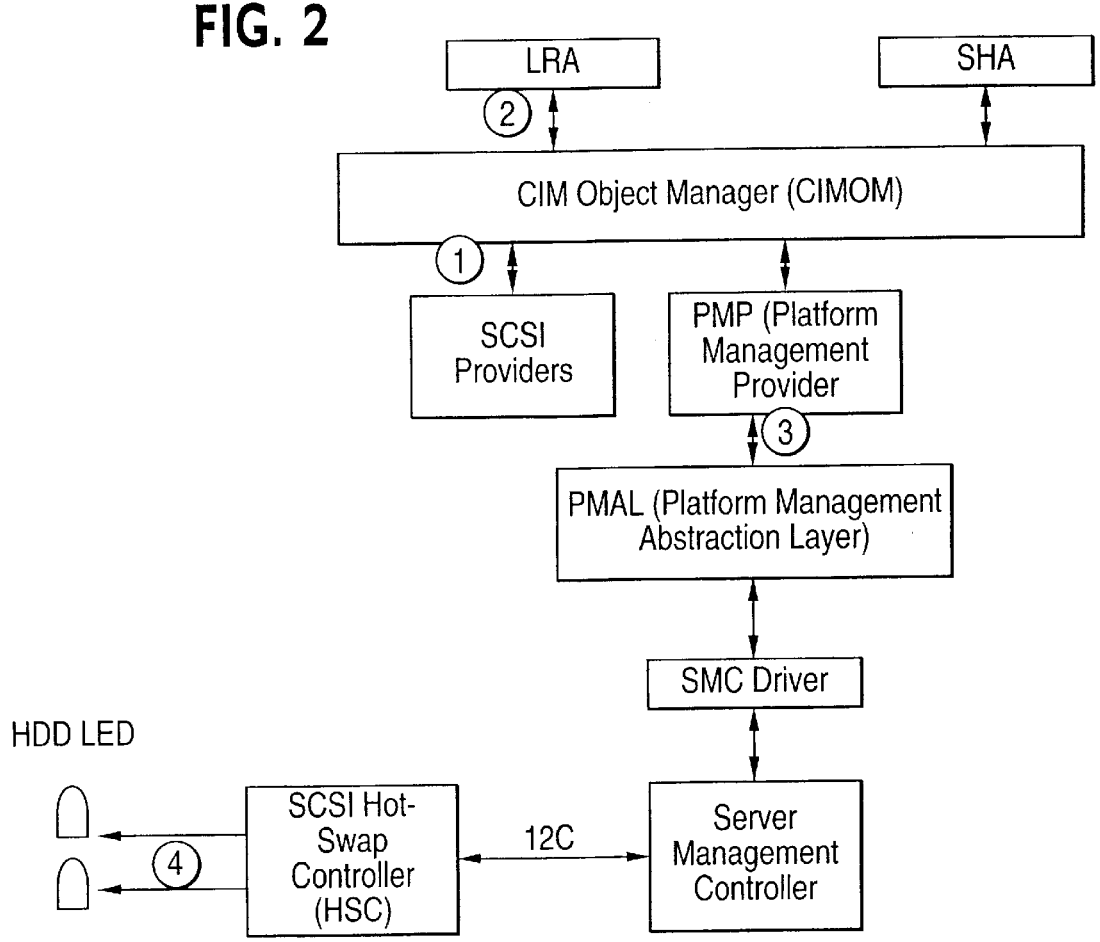
FIG. 2 is a block diagram illustrating an example of server management components.

FIG. 2 is another block diagram illustrating an example of the server management components. As illustrated in FIG. 2, the LRA (Local Response Agent) is responsible for monitoring all of events originating from the PMP (Platform Management Provider) or other CIM (Conceptual Information Model) based providers and taking pre-configured actions for that event. Instructions regarding various actions and events are set up and designated by the user.

The SHA (Server Health Agent) obtains information regarding the overall health of the server. The SHA subscribes to all events that a configured for health status contribution. Various event classes can be user configurable via a management application. The SHA generates health update events, which will, in turn, update the managed server's health depiction. There is no direct user interface to the SHA but rather all interfaces are via a management application. The SHA maintains a database and reads it and updates information from that database. Management applications update this database with various health related configurable parameters.

The PMP includes all the WMI (Windows Management Interface) specific code and interacts with the Windows Management. It also registers the CIM Schema (e.g.—sensors, processor, memory, etc.) with Windows Management.

The PMAL (Platform Management Abstraction Layer) isolates the hardware specific knowledge of the devices and presents a common interface to this module. This interface is exposed via a user mode DLL. The PMP uses the API routines that are exposed by the PMAL.DLL. The DLL communicates to the SMC (Server Management Controller) Driver using a private interface. The DLL converts the API requests into an IOCTL interface.

The SMC Driver interacts with the SMC (Server Management Controller) to issue commands to the firmware and to process the responses.

The HSC (Hot-Swap Controller) controls the drive fault lights, indicated as the HDD LEDs in FIG. 2, and utilizes up to two main interfaces to communicate with the remainder of the system, namely, the SCSI bus using the SAF-TE command set (not shown) in the case of a system having a RAID controller and either the I2 C (Inter-Integrated Circuit) bus or the IPMB (Intelligent Platform Management Bus) which is built on the I2 C bus.

As noted above, while the arrangement of FIG. 1 informs the user of an HDD failure in an efficient manner, a BMC or RAID controller is necessary. Since, an entry level server does not contain a RAID controller and since at appliance server does not include a BMC or RAID controller, there is a need for a hard disk drive reporting technique which operates without using SAF-TE logic.

As illustrated in FIG. 2, when there is a failure of an HDD, one of the SCSI providers reports a failure event to the CIMOM indicating that a particular HDD has failed. The LRA is programmed to respond to an internal HDD failure event by sending a message via the CIMOM to the PMP which then sends a command to the PMAL. The PMAL in turn sends a command to the SMC driver which forwards the command to the SMC. The SMC then sends a command to the HSC to turn on the appropriate failure HDD LED (that is, the appropriate drive fault light).

It is to be noted that in the arrangement of FIG. 2, the SAF-TE logic was not needed, thereby obviating the need for a RAID controller.

Figure 3:
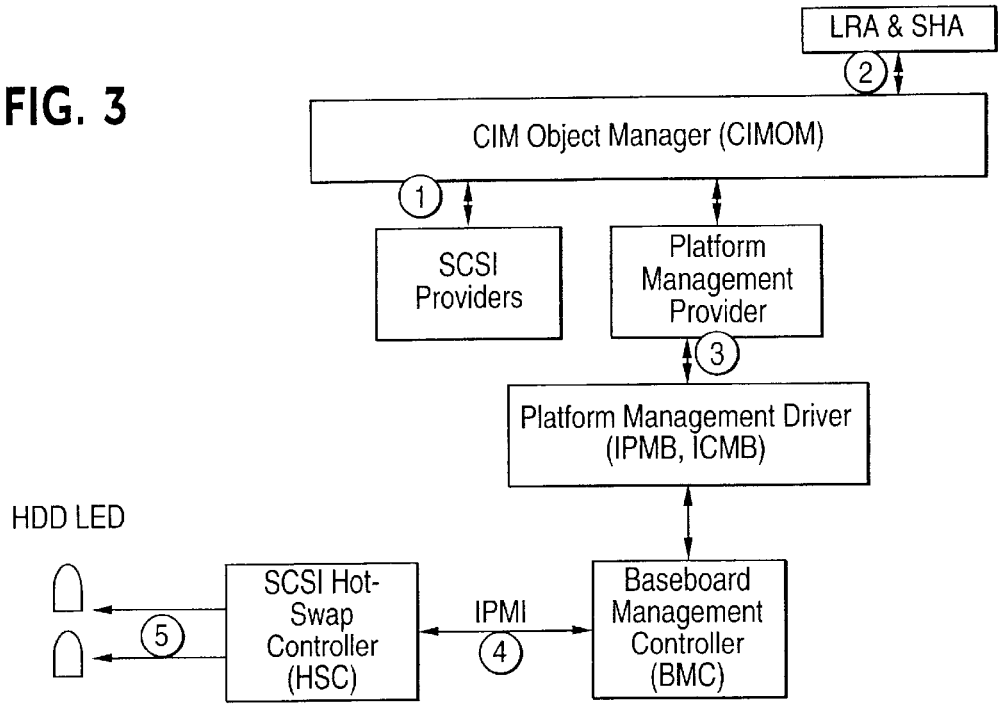
FIG. 3 is a block diagram illustrating an example of entry level server management components.

FIG. 3 is a block diagram illustrating an example of entry level server management components which may operate in accordance with an example of the hard disk drive failure reporting technique in accordance with the present invention.

As illustrated in FIG. 3, as compared to the arrangement of FIG. 2, the PMAL and SMC Driver and SMC of FIG. 2 are replaced by the PMD (Platform Management Driver) including the IPMB or ICMB and the BMC directly driving the HSC.

When there is a failure of an HDD, one of the SCSI providers reports a failure event to the CIMOM indicating that a particular HDD has failed. The LRA is programmed to respond to an internal HDD failure event by sending a message via the CIMOM to the PMP. The PMP then sends a command to the BMC which in turn sends an IMPI command to the HSC to turn on the appropriate failure HDD LED (that is, the appropriate drive fault light).

It is to be noted that in the arrangement of FIG. 3, the SAF-TE logic was not needed, thereby obviating the need for a RAID controller.

Figure 4:
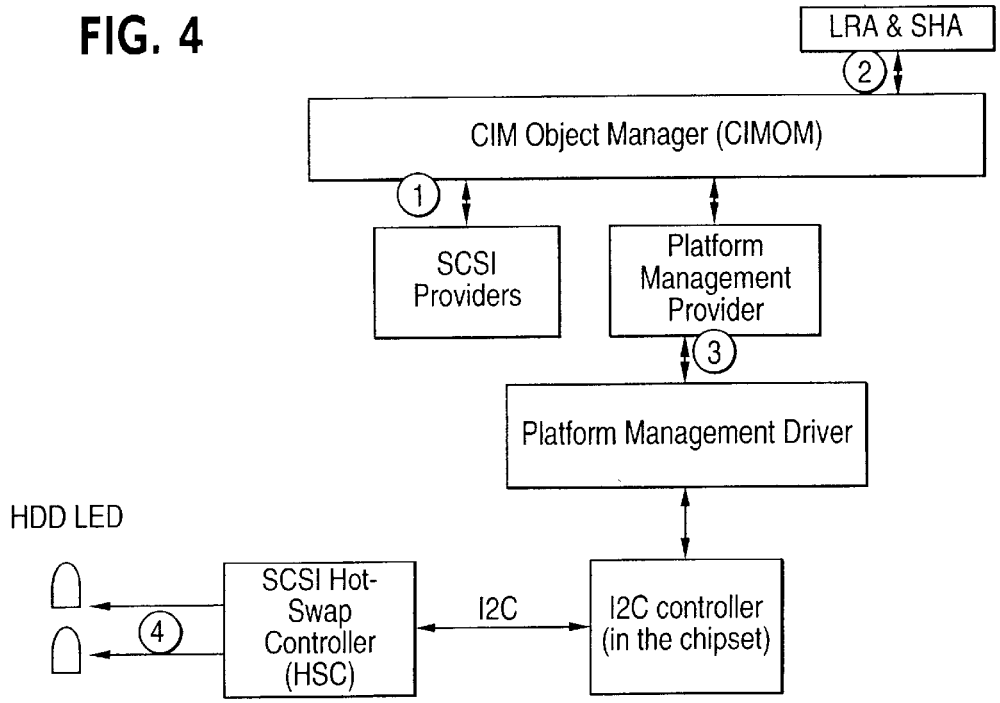
FIG. 4 is a block diagram illustrating an example of appliance server management components.

Similarly, FIG. 4 is a block diagram illustrating an example of appliance server management components which may operate in accordance with an example of the hard disk drive failure reporting technique in accordance with the present invention.

As illustrated in FIG. 4, as compared to the arrangement of FIG. 2, the PMAL and SMC driver and SMC are replaced by the Platform Management Driver and I2 C Controller included in the chipset. When there is a failure of an HDD, one of the SCSI providers reports a failure event to the CIMOM indicating that a particular HDD has failed. The LRA is programmed to respond to an internal HDD failure event by sending a message via the CIMOM to the PMP. The PMP sends a command to the HSC via the Platform Management Driver and I2 C Controller to turn on the appropriate failure HDD LED.

It is to be noted that in the arrangement of FIG. 4, the SAF-TE logic was also not needed, thereby obviating the need for a RAID controller or BMC.

This concludes the description of the example embodiments. Although the present invention has been described with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will be apparent to those skilled in the art.

What is claimed is:

1. A method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM;

sending a command from the PMP to a BMC (Baseboard Management Controller);

sending a command from the BMC to an HSC (Hot-Swap Controller); and activating a display by the HSC, the display reporting the failure of the particular hard disk drive to a user.

2. The method of claim 1, wherein the command sent from the BMC to the HSC comprises an IMPI (Intelligent Platform Management Interface) command.

3. The method of claim 1, wherein the display comprises a plurality of LEDs (Light Emitting Diodes).

4. The method of claim 1, wherein the PMP sends the command to the BMC via an IPMB (Intelligent Platform Management Bus).

5. The method of claim 1, wherein the PMP sends the command to the BMC via an ICMB (Inter-chassis Management Bus).

6. The method of claim 1, wherein the failure of the particular hard disk drive is detected by a SCSI (Small Computer System Interface) provider.

7. The method of claim 1, wherein the plurality of hard disk drives comprises a RAID (Redundant Array of Inexpensive Drives) array.

8. A program storage device, readable by a machine, tangibly embodying a program of instructions executable by the machine to perform a method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM;

sending a command from the PMP to a BMC (Baseboard Management Controller);

sending a command from the BMC to an HSC (Hot-Swap Controller); and activating a display by the HSC, the display reporting the failure of the particular hard disk drive to a user.

9. The device of claim 8, wherein the command sent from the BMC to the HSC comprises an IMPI (Intelligent Platform Management Interface) command.

10. The device of claim 8, wherein the display comprises a plurality of LEDs (Light Emitting Diodes).

11. The device of claim 8, wherein the PMP sends the command to the BMC via an IPMB (Intelligent Platform Management Bus).

12. The device of claim 8, wherein the PMP sends the command to the BMC via an ICMB (Inter-chassis Management Bus).

13. The device of claim 8, wherein the failure of the particular hard disk drive is detected by a SCSI (Small Computer System Interface) provider.

14. The device of claim 8, wherein the plurality of hard disk drives comprises a RAID (Redundant Array of Inexpensive Drives) array.

15. A computer system comprising:

a plurality of hard disk drives;

a SCSI (Small computer System Interface) provider operatively connected to the plurality of hard disk drives, the SCSI provider to detect a failure of a particular one of the plurality of hard disk drives;

a CIMOM (Conceptual Information Model Object Manager) operatively connected to the SCSI provider;

an LRA (Local Response Agent) operatively connected to the CIMOM;

a PMP (Platform Management Provider) operatively connected to the CIMOM;

a BMC (Baseboard Management Controller) operatively connected to the PMP;

an HSC (Hot-Swap Controller) operatively connected to the BMC; and a display operatively connected to the HSC;

wherein, upon the detection of a failure of a particular hard disk drive, the SCSI provider reports the failure to the CIMOM which in turn forwards a message by the LRA to the PMP which in turn sends a command to the BMC which in turn sends a command to the HSC to activate the display, the display reporting the failure of the particular hard disk drive to a user.

16. The system of claim 15, wherein the command sent from the BMC to the HSC comprises an IMPI (Intelligent Platform Management Interface) command.

17. The system of claim 15, wherein the display comprises a plurality of LEDs (Light Emitting Diodes).

18. The system of claim 15, wherein the PMP sends the command to the BMC via an IPMB (Intelligent Platform Management Bus).

19. The system of claim 15, wherein the PMP sends the command to the BMC via an ICMB (Inter-chassis Management Bus).

20. The system of claim 15, wherein the plurality of hard disk drives comprises a RAID (Redundant Array of Inexpensive Drives) array.

21. A method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM;

sending a command from the PMP to an HSC (Hot-Swap Controller); and activating a display by the HSC, the display reporting the failure of the particular hard disk drive to a user.

22. The method of claim 21, wherein the display comprises a plurality of LEDs (Light Emitting Diodes).

23. The method of claim 21, wherein the failure of the particular hard disk drive is detected by a SCSI (Small Computer System Interface) provider.

24. The method of claim 21, wherein the plurality of hard disk drives comprises a RAID (Redundant Array of Inexpensive Drives) array.

25. A program storage device, readable by a machine, tangibly embodying a program of instructions executable by the machine to perform a method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM;

sending a command from the PMP to an HSC (Hot-Swap Controller); and activating a display by the HSC, the display reporting the failure of the particular hard disk drive to a user.

26. The device of claim 25, wherein the display comprises a plurality of LEDs (Light Emitting Diodes).

27. The device of claim 25, wherein the failure of the particular hard disk drive is detected by a SCSI (Small Computer System Interface) provider.

28. The device of claim 25, wherein the plurality of hard disk drives comprises a RAID (Redundant Array of Inexpensive Drives) array.

29. A computer system comprising:

a plurality of hard disk drives;

a SCSI (Small Computer System Interface) provider operatively connected to the plurality of hard disk drives, the SCSI provider to detect a failure of a particular one of the plurality of hard disk drives;

a CIMOM (Conceptual Information Model Object Manager) operatively connected to the SCSI provider;

an LRA (Local Response Agent) operatively connected to the CIMOM;

a PMP (Platform Management Provider) operatively connected to the CIMOM;

an HSC (Hot-Swap Controller) operatively connected to the PMP; and a display operatively connected to the HSC;

wherein, upon the detection of a failure of a particular hard disk drive, the SCSI provider reports the failure to the CIMOM which in turn forwards a message by the LRA to the PMP which in turn sends a command to the HSC to activate the display, the display reporting the failure of the particular hard disk drive to a user.

30. The system of claim 29, wherein the display comprises a plurality of LEDs (Light Emitting Diodes).

31. The system of claim 29, wherein the plurality of hard disk drives comprises a RAID (Redundant Array of Inexpensive Drives) array.

32. A method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM (Conceptual Information Model Object Manager);

sending a command from the PMP to an SMC (Server Management Controller) driver;

sending a command from the SMC driver to an SMC (Server Management Controller);

sending a command from the SMC to an HSC (Hot-Swap Controller; and activating a display by the HSC, the display reporting the failure of the particular hard disk drive to a user.

33. The method of claim 32, wherein the display comprises a plurality of LEDs (Light Emitting Diodes).

34. The method of claim 32, wherein the failure of a particular hard disk drive is detected by a SCSI (Small Computer System Interface) provider.

35. The method of claim 32, wherein the plurality of hard disk drives comprises a RAID (Redundant Array of Inexpensive Drives) array.

36. The method of claim 32, wherein sending a command from the PMP to the SMC driver comprises sending the command to a PMAL (Platform Management Extraction Layer) which in turn sends the command to the SMC driver.

37. A program storage device, readable by a machine, tangibly embodying a program of instructions executable by the machine to perform a method of reporting hard disk drive failure in a computer system, the method comprising:

detecting a failure of a particular one of a plurality of hard disk drives of the computer system;

reporting the failure of the particular one of the plurality of hard disk drives to a CIMOM (Conceptual Information Model Object Manager);

forwarding a message by an LRA (Local Response Agent) to a PMP (Platform Management Provider) via the CIMOM (Conceptual Information Model Object Manager);

sending a command from the PMP to an SMC (Server Management Controller) driver;

sending a command from the SMC driver to an SMC (Server Management Controller);

sending a command from the SMC to an HSC (Hot-Swap Controller; and activating a display by the HSC, the display reporting the failure of the particular hard disk drive to a user.

38. The device of claim 37, wherein the display comprises a plurality of LEDs (Light Emitting Diodes).

39. The device of claim 37, wherein the failure of a particular hard disk drive is detected by a SCSI (Small Computer System Interface) provider.

40. The device of claim 37, wherein the plurality of hard disk drives comprises a RAID (Redundant Array of Inexpensive Drives) array.

41. The device of claim 37, wherein sending a command from the PMP to the SMC driver comprises sending the command to a PMAL (Platform Management Extraction Layer) which in turn sends the command to the SMC driver.

42. A computer system comprising:

a plurality of hard disk drives;

a SCSI (Small Computer System Interface) provider operatively connected to the plurality of hard disk drives, the SCSI provider to detect a failure of a particular one of the plurality of hard disk drives;

a CIMOM (Conceptual Information Model Object Manager) operatively connected to the SCSI provider;

an LRA (Local Response Agent) operatively connected to the CIMOM;

a PMP (Platform Management Provider) operatively connected to the CIMOM;

a SMC (Server Management Controller) operatively connected to the PMP via a SMC driver; and a display operatively connected to the SMC;

wherein, upon the detection of a failure of a particular hard disk drive, the SCSI provider reports the failure to the CIMOM which in turn forwards the message by the LRA to the PMP which in turn sends a command to the SMC via the SMC driver to activate the display, the display reporting the failure of the particular hard disk drive to a user.

43. The system of claim 42, wherein the display comprises a plurality of LEDs (Light Emitting Diodes).

44. The system of claim 42, wherein the plurality of hard disk drives comprises a RAID (Redundant Array of Inexpensive Drives) array.

45. The system of claim 42, further comprising a PMAL (Platform Management Extraction Layer), disposed between the PMP and the SMC driver, to send a command from the PMP to the SMC driver.

* * * * *